(12) United States Patent
Lotter

(10) Patent No.: US 10,348,393 B2
(45) Date of Patent: Jul. 9, 2019

(54) MANAGING THE BEAM DIRECTION OF THE DONOR ANTENNA OF A MOBILE REPEATER

(71) Applicant: Nextivity, Inc., San Diego, CA (US)

(72) Inventor: Michiel Petrus Lotter, San Diego, CA (US)

(73) Assignee: NEXTIVITY, INC., San Diego, CA (US)

( * ) Notice: Subject to any disclaimer, the term of this patent is extended or adjusted under 35 U.S.C. 154(b) by 0 days.

(21) Appl. No.: 15/867,580

(22) Filed: Jan. 10, 2018

(65) Prior Publication Data
US 2018/0198515 A1 Jul. 12, 2018

Related U.S. Application Data

(60) Provisional application No. 62/444,766, filed on Jan. 10, 2017.

(51) Int. Cl.
*H04B 7/15* (2006.01)
*H04B 7/155* (2006.01)
(Continued)

(52) U.S. Cl.
CPC ......... *H04B 7/1555* (2013.01); *H04B 7/0695* (2013.01); *H04B 7/088* (2013.01);
(Continued)

(58) Field of Classification Search
CPC .............. H04B 7/15528; H04B 7/1555; H04B 7/15564; H04B 7/0632; H04B 7/0634; H04W 24/10; H04W 88/085
See application file for complete search history.

(56) References Cited

U.S. PATENT DOCUMENTS

| | | | | |
|---|---|---|---|---|
| 5,138,327 A | * | 8/1992 | Chang | H04B 7/088 342/367 |
| 9,026,122 B2 | * | 5/2015 | Waz-Ambrozewicz | H04B 7/0695 455/452.1 |

(Continued)

FOREIGN PATENT DOCUMENTS

| | | |
|---|---|---|
| EP | 2802089 A1 | 11/2014 |
| WO | 2010033779 A1 | 3/2010 |

OTHER PUBLICATIONS

International Search Report and Written Opinion for International Patent Application No. PCT/US2018/013202, dated Mar. 29, 2018, 10 pages.

*Primary Examiner* — Siu M Lee
(74) *Attorney, Agent, or Firm* — Mintz Levin Cohn Ferris Glovsky and Popeo, P.C.

(57) ABSTRACT

An antenna control algorithm is disclosed. Using this algorithm, the repeater will select an optimum antenna configuration at start-up. Once the configuration is selected, the system will keep this configuration until the performance metrics for this configuration drops below a specified level. At this point, the system will scan all antenna configurations to determine a new optimum configuration. In an alternative implementation, the repeater will select an optimum antenna configuration at start-up. Once the configuration is selected, the system will keep this configuration until the performance metrics for this configuration drops below a specified level. At this point, the system will start scanning antenna configurations to find a new configuration that yields a performance better than the required minimum performance level. This configuration would typically be faster than an optimum configuration as not all possible options need to be tested.

17 Claims, 2 Drawing Sheets

(51) Int. Cl.
*H04W 24/10* (2009.01)
*H04B 7/06* (2006.01)
*H04B 7/08* (2006.01)
*H04W 88/08* (2009.01)

(52) U.S. Cl.
CPC .......... *H04B 7/0842* (2013.01); *H04W 24/10* (2013.01); *H04B 7/0617* (2013.01); *H04B 7/0634* (2013.01); *H04W 88/085* (2013.01)

(56) References Cited

U.S. PATENT DOCUMENTS

| | | | |
|---|---|---|---|
| 2006/0040707 A1* | 2/2006 | Kish | H04B 7/061 455/562.1 |
| 2010/0231473 A1* | 9/2010 | Shtrom | H01Q 1/2291 343/757 |
| 2014/0009338 A1* | 1/2014 | Lin | H01Q 3/247 342/374 |
| 2015/0295310 A1 | 10/2015 | Hazelton et al. | |
| 2015/0380816 A1 | 12/2015 | Tajika et al. | |
| 2016/0227354 A1* | 8/2016 | Zhao | H04B 1/48 |
| 2017/0315239 A1* | 11/2017 | Chiu | G01S 19/235 |

* cited by examiner

MANAGING THE BEAM DIRECTION OF THE DONOR ANTENNA OF A MOBILE REPEATER

CROSS-REFERENCE TO RELATED APPLICATION

The current application claims priority to U.S. Provisional patent application Ser. No. 62/444,766, filed on Jan. 10, 2017, entitled "MANAGING THE BEAM DIRECTION OF THE DONOR ANTENNA OF A MOBILE REPEATER", which is incorporated by reference herein in its entirety.

BACKGROUND

The present invention relates to mobile repeaters, and more particularly to a system and method to dynamically manage the radiation pattern of the donor antenna of a mobile repeater system.

When an antenna system with configurable beam patterns is used as the donor antenna of a mobile repeater system a problem arises in that the antenna configuration must be adapted to the environment the repeater is operating in. If the antenna beam pattern can be continuously adapted to track the incoming signal as well as scan for new donor signals simultaneously, the problem is simple.

For example, assume the repeater donor antenna is an antenna array capable of simultaneously forming two beam patterns (similar to what is used in Multi-User MIMO systems). In this case, one beam pattern can be used to point to the donor base station and can be constantly adjusted to track the donor base station. The second beam pattern can then be used to scan for a more optimum donor base station and if one is found, the antenna configuration can be changed to point to the new donor base station. However, such an antenna system is complex and typically expensive to implement. Typically, a repeater donor antenna will have a single configuration only.

Assuming that only a single configuration is available, the problem is how to select the best configuration to be used and how to maintain an adequate input signal while the repeater moves.

SUMMARY

This document presents a system and method to dynamically manage the radiation pattern of the donor antenna of a mobile repeater system.

In one aspect, an antenna control algorithm is provided. Using this algorithm, the repeater will select an optimum antenna configuration at start-up. Once the configuration is selected, the system will keep this configuration until the performance metrics for this configuration drops below a specified level. At this point, the system will scan all antenna configurations to determine a new optimum configuration.

In another aspect, a speed optimized antenna control algorithm is provided. The repeater will select an optimum antenna configuration at start-up. Once the configuration is selected, the system will keep this configuration until the performance metrics for this configuration drops below a specified level. At this point, the system will start scanning antenna configurations to find a new configuration that yields a performance better than the required minimum performance level. This configuration would typically be faster than an optimum configuration as not all possible options need to be tested.

Together, the algorithms described herein, and systems to execute them, provide a way to dynamically manage the radiation pattern of the donor antenna of a mobile repeater system.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a system and method to dynamically manage the radiation pattern of the donor antenna of a mobile repeater system.

Figure 1:
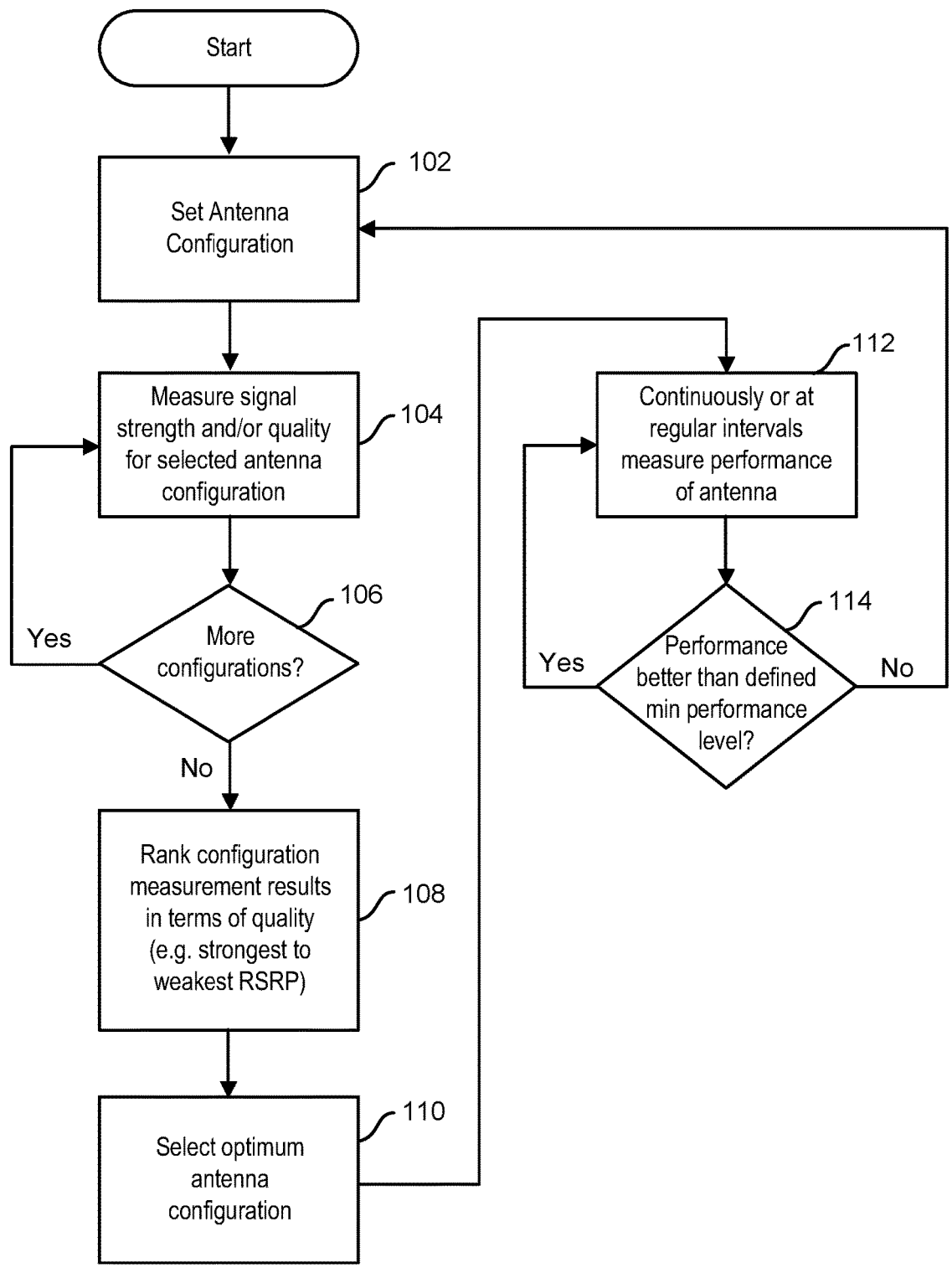
FIG. 1 is a flowchart of an antenna control algorithm.

FIG. 1 is a flowchart of a method 100 for controlling an antenna. At 102, a configuration of the antenna is set or selected. At 104, a signal strength and/or signal quality is measured for the selected antenna configuration. At 106, it is determined whether more configurations are needed or necessary. If yes, the method 100 repeats at 104, to measure the signal strength and/or signal quality to set or select a new configuration. If no, then at 108, the configuration measurement results are ranked in terms of quality (e.g., strongest to weakest RSRP). At 110, the optimum antenna configuration is selected. At 112, the performance of the antenna, while operating in the optimum selected antenna configuration, is measured, continuously or at regular intervals. At 114, it is determined whether the performance is better than a minimal performance level of the optimum selected antenna configuration. If yes, the method 100 repeats at 112. If no, the method 100 repeats at 102 and cycles through the method 100 again.

Using this algorithm, the repeater will select an optimum antenna configuration at start-up. Once the configuration is selected, the system will keep this configuration until the performance metrics for this configuration drops below a specified level. At this point, the system will scan all antenna configurations to determine a new optimum configuration.

Figure 2:
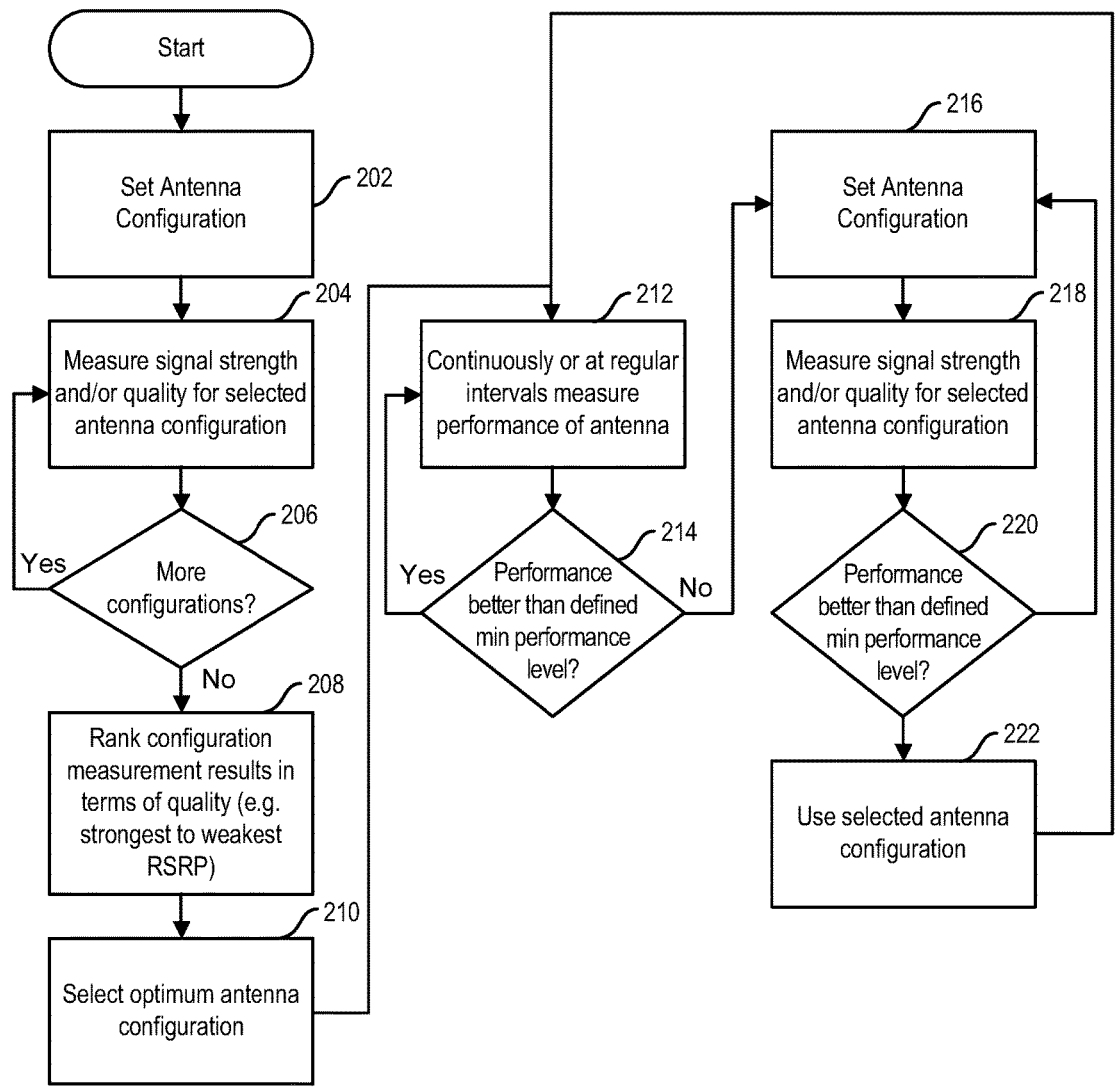
FIG. 2 is a flowchart of a speed optimized antenna control algorithm.

FIG. 2 is a flowchart of a method 200 for a speed optimized antenna control algorithm for controlling an antenna. At 202, a configuration of the antenna is set or selected. At 204, a signal strength and/or signal quality is measured for the selected antenna configuration. At 206, it is determined whether more configurations are needed or necessary. If yes, the method 200 repeats at 204, to measure the signal strength and/or signal quality to set or select a new configuration. If no, then at 208, the configuration measurement results are ranked in terms of quality (e.g., strongest to weakest RSRP). At 210, the optimum antenna configuration is selected. At 212, the performance of the antenna, while operating in the optimum selected antenna configuration, is measured, continuously or at regular intervals.

At 214, it is determined whether the performance is better than a minimal performance level of the optimum selected antenna configuration. If yes, the method 200 repeats at 212. If no, the method 200 executes at 216, in which a new configuration of the antenna is set or selected. At 218, a signal strength and/or signal quality is measured for the selected antenna configuration. At 220, it is again determined whether the performance is better than a minimal performance level of the optimum selected antenna configuration. If yes, then the method 200 repeats at 216. If no, then at 222 the selected antenna configuration is used, and the method 200 cycles back to 212.

Using this algorithm, the repeater will select an optimum antenna configuration at start-up. Once the configuration is selected, the system will keep this configuration until the performance metrics for this configuration drops below a specified level. At this point, the system will start scanning antenna configurations to find a new configuration that yields a performance better than the required minimum performance level. This configuration would typically be faster than an optimum configuration as not all possible options need to be tested.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof, to control the operations of a mobile repeater and antennas thereof.

These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A method for managing the beam direction of a donor antenna of a mobile repeater, the method comprising:
   setting an initial antenna configuration, the initial antenna configuration having a beam pattern comprising a plurality of beams, each beam of the plurality of beams having a direction from the donor antenna of the mobile repeater;
   measuring a signal strength or signal quality for the initial antenna configuration;
   determining one or more other antenna configurations based on the signal strength or signal quality;
   ranking the initial and the other antenna configurations based on the signal strength or signal quality;
   selecting an optimum antenna configuration of the donor antenna of the mobile repeater according to the ranking;
   measuring a performance of the donor antenna operating with the optimum antenna configuration; and
   determining whether the performance exceeds a predefined minimum performance level.

2. The method in accordance with claim 1, further comprising:
   if the performance does not exceed the predefined minimum performance level, setting a new antenna configuration.

3. The method in accordance with claim 2, further comprising
   measuring a signal strength or signal quality for the new antenna configuration;
   determining one or more other antenna configurations based on the signal strength or signal quality;
   ranking the new and the other antenna configurations based on the signal strength or signal quality to form a second ranking; and
   selecting a second optimum antenna configuration of the donor antenna of the mobile repeater according to the second ranking.

4. The method in accordance with claim 1, wherein measuring the performance of the donor antenna operating with the optimum antenna configuration is done continuously.

5. The method in accordance with claim 1, wherein measuring the performance of the donor antenna operating with the optimum antenna configuration is done at regular intervals.

6. The method in accordance with claim 1, wherein the performance includes a signal strength and/or a signal quality.

7. The method in accordance with claim 1, wherein the predefined minimum performance level includes a predefined signal strength level and/or a predefined signal quality level.

8. A method for managing the beam direction of a donor antenna of a mobile repeater for communicating with a base station, the method comprising:

setting an initial antenna configuration for the donor antenna, the initial antenna configuration having a beam pattern comprising a plurality of beams, each beam of the plurality of beams having a direction from the donor antenna of the mobile repeater;

measuring a signal strength or signal quality for the initial antenna configuration;

determining one or more other antenna configurations based on the signal strength or signal quality, of the other antenna configurations having a different beam pattern of the plurality of beams;

ranking the initial and the other antenna configurations based on the signal strength or signal quality;

selecting an optimum antenna configuration of the donor antenna of the mobile repeater according to the ranking, the optimum antenna configuration having an optimum beam pattern for communicating with the base station;

measuring a performance of the donor antenna operating with the optimum antenna configuration; and determining whether the performance exceeds a predefined minimum performance level.

9. The method in accordance with claim 8, further comprising:

if the performance does not exceed the predefined minimum performance level, setting a new antenna configuration.

10. The method in accordance with claim 9, further comprising measuring a signal strength or signal quality for the new antenna configuration;

determining one or more other antenna configurations based on the signal strength or signal quality;

ranking the new and the other antenna configurations based on the signal strength or signal quality to form a second ranking; and selecting a second optimum antenna configuration of the donor antenna of the mobile repeater according to the second ranking.

11. The method in accordance with claim 8, wherein measuring the performance of the donor antenna operating with the optimum antenna configuration is done continuously.

12. The method in accordance with claim 8, wherein measuring the performance of the donor antenna operating with the optimum antenna configuration is done at regular intervals.

13. A system for managing the beam direction of a donor antenna of a mobile repeater, the system comprising a processor configured to perform operations comprising:

setting an initial antenna configuration, the initial antenna configuration including a beam pattern comprising a plurality of beams, each beam of the plurality of beams including a direction from the donor antenna of the mobile repeater;

measuring a signal strength or signal quality for the initial antenna configuration;

determining one or more other antenna configurations based on the signal strength or signal quality;

ranking the initial and the other antenna configurations based on the signal strength or signal quality;

selecting an optimum antenna configuration of the donor antenna of the mobile repeater according to the ranking;

measuring a performance of the donor antenna operating with the optimum antenna configuration; and determining whether the performance exceeds a predefined minimum performance level.

14. The system in accordance with claim 13, the operations further comprising:

if the performance does not exceed the predefined minimum performance level, setting a new antenna configuration.

15. The system in accordance with claim 14, the operations further comprising:

measuring a signal strength or signal quality for the new antenna configuration;

determining one or more other antenna configurations based on the signal strength or signal quality;

ranking the new and the other antenna configurations based on the signal strength or signal quality to form a second ranking; and selecting a second optimum antenna configuration of the donor antenna of the mobile repeater according to the second ranking.

16. The system in accordance with claim 13, wherein measuring the performance of the donor antenna operating with the optimum antenna configuration is done continuously.

17. The system in accordance with claim 13, wherein measuring the performance of the donor antenna operating with the optimum antenna configuration is done at regular intervals.

* * * * *